ANALOGUE INFORMATION STORAGE SYSTEMS

Inventors
Derek Arthur Linkens
George Clive Ashmead Talbot
By
Bailey, Stephens & Huettig
Attorneys

*Inventors*
*Derek Arthur Linkens*
*George Clive Ashmead Talbot*
*By*
*Bailey, Stephens & Huettig*
*Attorneys*

Inventors
Derek Arthur Linkens
George Clive Ashmead Talbot
By
Bailey, Stephens & Huettig
Attorneys Inventors
Derek Arthur Linkens
George Clive Ashmead Talbot
By
Bailey, Stephens & Huettig
Attorneys Inventors
Derek Arthur Linkens
George Clive Ashmead Talbot
By
Bailey, Stephens & Huettig
Attorneys Inventors
Derek Arthur Linkens
George Clive Ashmead Talbot
By
Bailey, Stephens & Huettig
Attorneys

"OVER-SET" CONDITION

FIRST "INTERROGATE" HALF-CYCLE AFTER FIG.17

SECOND "INTERROGATE" HALF-CYCLE AFTER FIG.17

Inventors
Derek Arthur Linkens
George Clive Ashmead Talbot
By
Bailey, Stephens & Huettig
Attorneys Inventors
Derek Arthur Linkens
George Clive Ashmead Talbot
By Bailey, Stephens & Huettig
Attorneys United States Patent Office 3,438,013

Patented Apr. 8, 1969

3,438,013

ANALOGUE INFORMATION STORAGE SYSTEMS

Derek Arthur Linkens, Burham, Rochester, and George C. A. Talbot, Chatham, England, assignors to Elliott Brothers (London) Limited, London, England, a company of Great Britain Filed Jan. 5, 1965, Ser. No. 423,469
Claims priority, application Great Britain, Jan. 6, 1964, 596/64
Int. Cl. G06f *11/04;* G11b *5/06*
U.S. Cl. 340—174 36 Claims

ABSTRACT OF THE DISCLOSURE

An analogue-type information-storage system which comprises a magnetic core with an associated input winding, interrogate winding and output winding. A non-destructive read-out circuit is arranged to apply an interrogate signal of a selected frequency to the interrogate winding and to derive from the output winding output signal representing the information stored within the core. A delay circuit is connected for delaying the output signal. Comparison circuit is arranged to compare the delayed output signal with an input signal representing the information required to be stored to derive an error signal. The error signal is applied to the input winding to modify the information stored within the core so as to reduce the error signal. A switching device is operable at a frequency lower than the selected frequency to alternately connect the non-destructive read-out circuit to the interrogate winding and the comparison circuit to the input winding.

This invention is concerned with improvements in or relating to analogue-type information storage systems.

It is an object of the present invention to provide an improved analogue-type information-storage system which shall be capable of storing information for relatively long periods of time and which shall be economic to manufacture.

According to the invention, there is provided an analogue-type information-storage system which comprises a magnetic core having at least two apertures, an input winding associated with one of the two apertures, an interrogate winding and an output winding associated with the other of the two apertures, circuit means for applying an interrogate signal of a selected frequency to the interrogate winding to derive from the output winding an output signal representing the information actually stored within the core in the form of a magnetic-flux pattern, delay means for delaying the output signal, comparison means arranged to compare the delayed output signal with an input signal representing the information required to be stored within the core to derive an error signal to be applied to the input winding to modify the information stored within the core in the sense to tend to reduce the error signal, switch means operable at a frequency lower than said selected frequency and arranged to alternately connect the interrogate signal to the interrogate winding and the error signal to the input winding, and cut-off means operable to disconnect the error signal from the input winding to permit the core to store the information.

Conveniently, the magnetic core is made of a suitable "ferrite" material, for example a suitable moulded ceramic "ferrite" material.

Preferably, the material of the magnetic core has an approximately rectangular magnetic-hysteresis loop.

Preferably, the said one aperture is larger than the said other aperture, and the two apertures are preferably each of circular cross-section.

Preferably, the apertures divide the core into a first limb surrounding the said one aperture, a second limb located between the two apertures, and a third limb located at that side of the said other aperture which is distant from the said one aperture, the output winding being wound around the third limb. The interrogate winding may be wound around the second limb, while the input winding may be wound around the first limb.

Conveniently, the magnetic core is provided by a commercially available "transfluxor."

The circuit means may comprise an oscillator arranged to generate a periodic interrogate signal of the said selected frequency.

The output winding may be connected to rectifying means arranged to rectify the output of the output winding.

The delay means may be afforded by an amplifier having a feedback circuit connected between its output and its input.

The comparison means may comprise a differential amplifier having a feedback connection between its output and its input and arranged to tend to stabilise the system.

The switch means may comprise a first switching circuit capable of disconnecting the error signal from the input winding, and a second switching circuit capable of disconnecting the said circuit means from the interrogate winding, in which case the system may include a bi-state device arranged to control the alternate operation of the first and the second switching circuits.

The delaying circuit may be connected between the said circuit means and the interrogate winding, so as to delay the application of the interrogate signal to the interrogate winding for a predetermined period after the switch means has operated to tend to connect the interrogate signal to the interrogate winding.

The system may include limiting means arranged to limit the maximum permissible amplitude of the error signal.

The system may also include an electric circuit arranged to modify the error signal, in the sense to increase the effect of the error signal upon the magnetic core, when the error signal is of one polarity, but not to modify the error signal when the error signal is of the relatively opposite polarity.

The cut-off means may comprise a switch operable to connect the output of the comparison means to the input thereof.

Preferably, the magnetic core is enclosed within a constant-temperature enclosure.

One embodiment of the invention will now be described by way of example, reference being made to the accompanying drawings of which:

Figure 1:
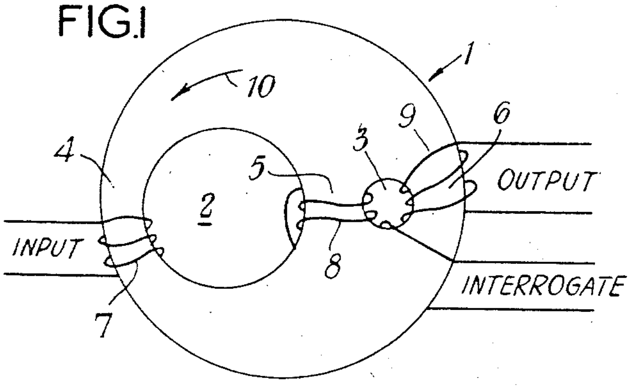
FIGURE 1 shows a magnetic core which is used as a magnetic storage element in the analogue-type information-storage system according to the invention.
Figure 2:
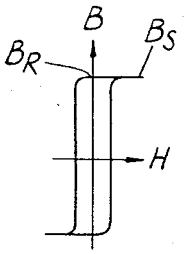
FIGURE 2 shows the form of the magnetic-hysteresis loop of the core of FIGURE 1.

The analogue-type information-storage system of the invention employs, as a magnetic storage element, a magnetic core 1 (FIGURE 1) which is in the form of a flat plate about ⅛ inch (0.32 cms.) in thickness and which is made of a material having an approximately rectangular magnetic-hysteresis loop (FIGURE 2). The core 1 is formed with two circular-section apertures, 2 and 3, and may be made of a suitable "ferrite" material, for example a suitable moulded ceramic ferrite material.

The aperture 2 is of larger diameter than the aperture 3, so as to divide the core 1 into three limbs: a limb 4 which partly surrounds the larger aperture 2, and limbs 5 and 6 which are located at opposite sides of the smaller aperture 3. The cross-sectional areas of the limbs 5 and 6 are preferably substantially equal, while the cross-sectional area of the limb 4 should preferably be greater than or equal to the sum of the cross-sectional areas of the limbs 5 and 6.

An input winding 7 is associated with the larger aperture 2, and may be wound around the limb 4. An "interrogate" winding 8 and an output winding 9 are associated with the smaller aperture 3: the interrogate winding 8 may be wound around the limb 5, and the output winding 9 may be wound around the limb 6.

A magnetic core arranged in this way has the property of storing information in the form of a magnetic-flux pattern, and such a core is commonly referred to as a "transfluxor." The operation of transfluxors is discussed in the following published articles:

(i) "The Transfluxor—A Magnetic Gate with Stored Variable Setting," by J. A. Rajchman and A. W. Lo, "R.C.A. Review," June 1955, pp. 303–311, and (ii) "On the Process of Flux Reversal in Multi-aperture Ferrite Cores," by I. A. Rowe and G. R. Slemon, "Communication and Electronics" (published by the American Institute of Electrical Engineers), No. 56, September 1961, pp. 431–438.

The operation of a magnetic core of the form of the core 1 is not fully understood, but it is believed to be as now described.

In order to use the core 1 as a magnetic-storage element, the core must first be "blocked"; this involves passing through the input winding 7 an electric "blocking" pulse which causes the core 1, and in particular the limbs 5 and 6, to become magnetically saturated in one direction. Referring to FIGURE 1, the core 1 is assumed to be "blocked" by magnetisation of the core 1 in the anticlockwise direction of the arrow 10. When the blocking pulse has ended, the magnetisation of the core 1 decreases slightly (referring to FIGURE 2, the magnetic induction B in the core 1 reduces from the saturation value $B_s$ to the remanent value $B_R$, as the magnetising field H is reduced to zero), but remains substantially constant because of the fact that the material of the core 1 has an approximately rectangular magnetic-hysteresis loop.

When the core 1 has been blocked in this way, and a suitable "interrogate" signal is thereafter applied to the interrogate winding 8, the interrogate signal being in the form of an electric pulse, or of an electric pulse-train or other suitable periodic electric signal, virtually no transformer action is able to occur between the interrogate winding 8 and the output winding 9 because the limbs 5 and 6 are substantially magnetically saturated and, hence, cannot provide a suitable flux-path around the smaller aperature 3. Consequently, the interrogate signal applied to the interrogate winding is unable to induce, in the output winding 9, any substantial output voltage.

In order to use the core 1 as a magnetic-storage element, it is first blocked as just described, and is thereafter "set." To set the core 1, a suitable electric "setting" pulse is applied to the input winding 7, the setting pulse being of opposite polarity to that of the blocking pulse. The setting pulse is designed to tend to reverse the direction of magnetisation of at least a part of the limb 5, but should not affect the magnetisation of the limb 6 (as discussed below).

When the core 1 has been set in this way, by the setting pulse, at least a part of the limb 5 is effectively magnetically saturated in the reverse direction to that mentioned above, i.e. in the clockwise direction opposite to that of the arrow 10 (FIGURE 1). Consequently, if the suitable interrogate signal referred to above is now applied to the interrogate winding 8 (if the interrogate signal is a single pulse, it must be of the correct polarity), then transformer action is able to occur between the interrogate winding 8 and the output winding 9, and an output voltage will be induced in the output winding 9.

It has been found that, after the core 1 has been set by the setting pulse, and when the suitable interrogate signal is applied to the interrogate winding 8, the amplitude of the resulting output voltage from the output winding 9 is a non-linear function of the amplitude of the setting pulse.

Furthermore, once the core 1 has been set, and information has been stored within it in the form of a magnetic-flux pattern, the information can be sampled at any time, by applying a suitable interrogate signal, without destroying the stored information.

Furthermore, the information stored within the core 1 can be stored for relatively long periods of time.

Certain precautions must be taken, to ensure that the core 1 is operated in the required manner. Firstly, the amplitude of the setting pulse must not be large enough to "over-set" the core 1, i.e. the amplitude of the setting pulse must not be so great that the magnetisation of any part of the limb 6 is reversed during the setting operation upon the core 1. Secondly, the amplitude of the interrogate signal must not be large enough to "over-drive" the core 1, i.e. the amplitude of the interrogate signal must not be so great that it tends to reverse the magnetisation of the limb 4. It will be appreciated that, if both over-setting and over-driving are avoided in this way, then there is virtually no magnetic coupling between the input and output circuits of the core 1. Finally, the amplitude of the interrogate signal must, however, be large enough to suitably reverse the direction of magnetisation in the parts of the limbs 5 and 6 which surround the smaller aperture 3, since the device will otherwise not operate in the required manner.

Figure 3:
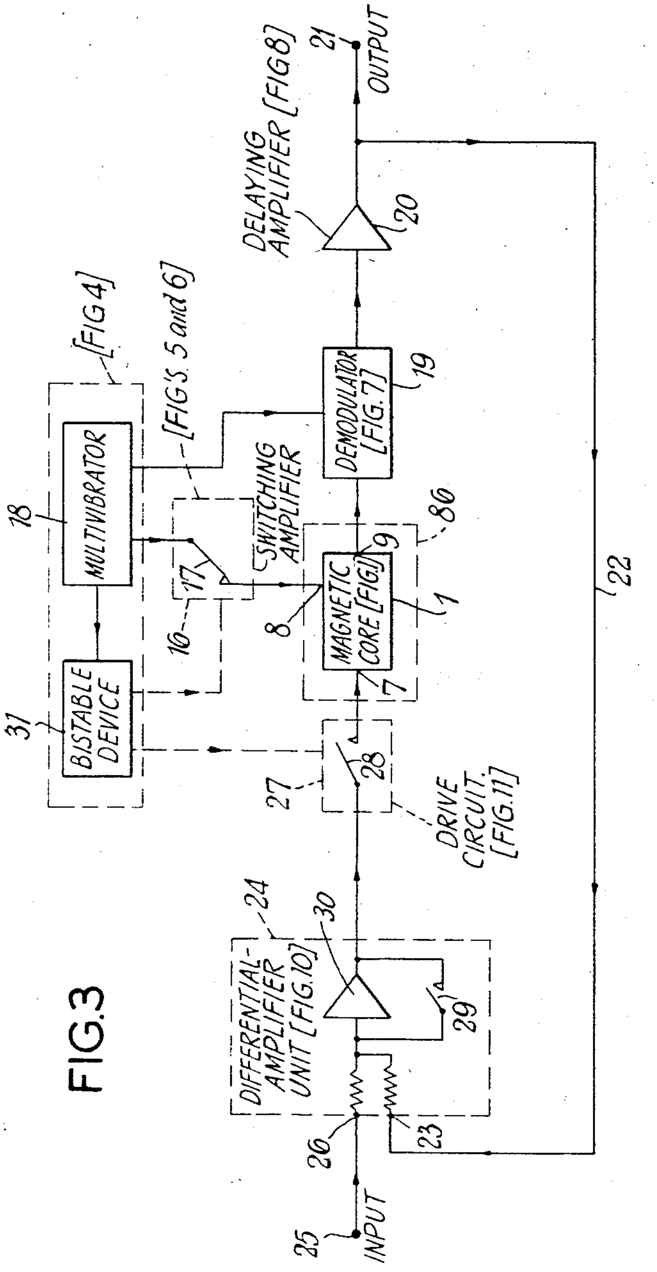
FIGURE 3 is a block-schematic diagram of an analogue-type information-storage system according to the invention.

FIGURE 3 is a block-schematic diagram of an analogue-type information storage system according to the invention. The storage system includes the magnetic core 1 of FIGURE 1, the connections to the input winding, to the interrogate winding, and to the output winding being indicated at 7, 8 and 9 respectively in FIGURE 3.

The interrogate winding 8 is supplied, through a switching circuit 16 which contains an effective on-off switch 17 with an interrogate signal which is in the form of an electric pulse-train of a selected frequency and which is generated by a multivibrator 18. The frequency of the pulse-train may conveniently be 10 kc./s. Assuming that the magnetic core 1 has been first blocked and then set as described above, then the interrogate signal will produce an output voltage in the output winding 9, the output voltage being in the form of an output pulse for each half-cycle of the interrogate signal. The time integral of each such output pulse represents the information stored in the flux-pattern in the core 1.

Alternate output pulses are of relatively opposite polarity, so the output pulses from the output winding 9 are rectified by a phase-sensitive demodulator 19 which is controlled by the output of the multivibrator 18. The rectified pulses are then passed to a delaying amplifier 20, wherein the rectified pulses are amplified and are also delayed for a suitable period of time.

The output of the amplifier 20 is a direct voltage of which the amplitude is a function of the information stored in the flux-pattern in the core 1. The output of the amplifier 20 is supplied to an output terminal 21 and is also supplied, over a feedback line 22, to one input terminal 23 of a two-input differential-amplifier unit 24.

With the arrangement of the drawings, the analogue signal to be stored within the information-storage system must be in the form of a direct voltage, or of an extended voltage pulse, of which the amplitude represents the information to be stored. This analogue signal is supplied to the input terminal 25 of the information-storage system, and thence to the other input terminal 26 of the differential-amplifier unit 24. The output of the differential-amplifier unit 24 thus comprises a voltage error signal of which the amplitude represents the difference between the information actually stored within the magnetic core 1 and the information required to be stored within the magnetic core 1.

This error signal is supplied, through a drive circuit 27 which contains an effective on-off switch 28, to the input winding 7 of the magnetic core 1. The effect of the error signal if thus to modify the flux-pattern within the core 1, in the sense to tend to reduce the error signal and to thereby ensure that the information stored within the magnetic core 1 corresponds to the information supplied by the analogue signal.

Within the differential-amplifier unit 24, a normally open on-off switch 29 is provided. The switch 29 can be closed to connect the output of the amplifier 30 within the unit 24 to the input of that amplifier, thus preventing the differential-amplifier unit 24 from supplying the error signal to its output, and so effectively isolating the input winding 7 of the magnetic core 1.

The provision of the effective on-off switches 17 and 28 is an essential feature of the present invention. Thus, it has been found that, if the effective switches 17 and 28 are both closed simultaneously, so that error signals are supplied to the input winding of the core 1 at the same time as an interrogate signal is supplied to the interrogate winding 8, then the information-storage system does not operate as required, in that the magnetic core 1 does not always supply the same output signal, in response to a suitable interrogate signal, when the same information is stored within the core 1.

In order to ensure that the information-storage system operates as required, the effective switches 17 and 28 are arranged to be operated alternatively, so that the effective switch 28 is first maintained open, while the effective switch 17 is closed to permit the interrogate signal to be supplied to the interrogate winding 8, this resulting in the appearance at the output of the amplifier 20 of a delayed direct-voltage output signal of which the amplitude represents the information stored within the core 1. Thereafter, the effective switch 17 is opened, and the effective switch 28 is closed so as to permit an error signal to be supplied to the input winding 7, the amplitude of this error signal representing the difference between the amplitude of the analogue signal and the amplitude of the output signal from the amplifier 20, the output signal from the amplifier 20 representing the information found, while the effective switch 17 was previously closed and the information content of the core 1 was sampled, to be stored within the core 1.

The effective switches 17 and 28 are arranged to be operated alternately by a bistable device 31 which is driven by the multivibrator 18. The frequency of the bistable device, that is to say the frequency of operation of the effective switches 17 and 28, is determined by reference to the frequency of the interrogate-signal pulse-train supplied by the multivibrator 18 to the interrogate winding 8. The switch 17 should be closed for at least one cycle of the output of the multivibrator 18, so that the maximum frequency of operation of the bistable device 31 is one-half of the frequency of the multivibrator, i.e. the maximum frequency is 5 kc./s. in the present case. To attempt to improve the accuracy of the device, more than one complete cycle of the output of the multivibrator 18 may be supplied to the interrogate winding 8 during one sampling; the frequency of the bistable device would then have to be reduced.

Figure 4:
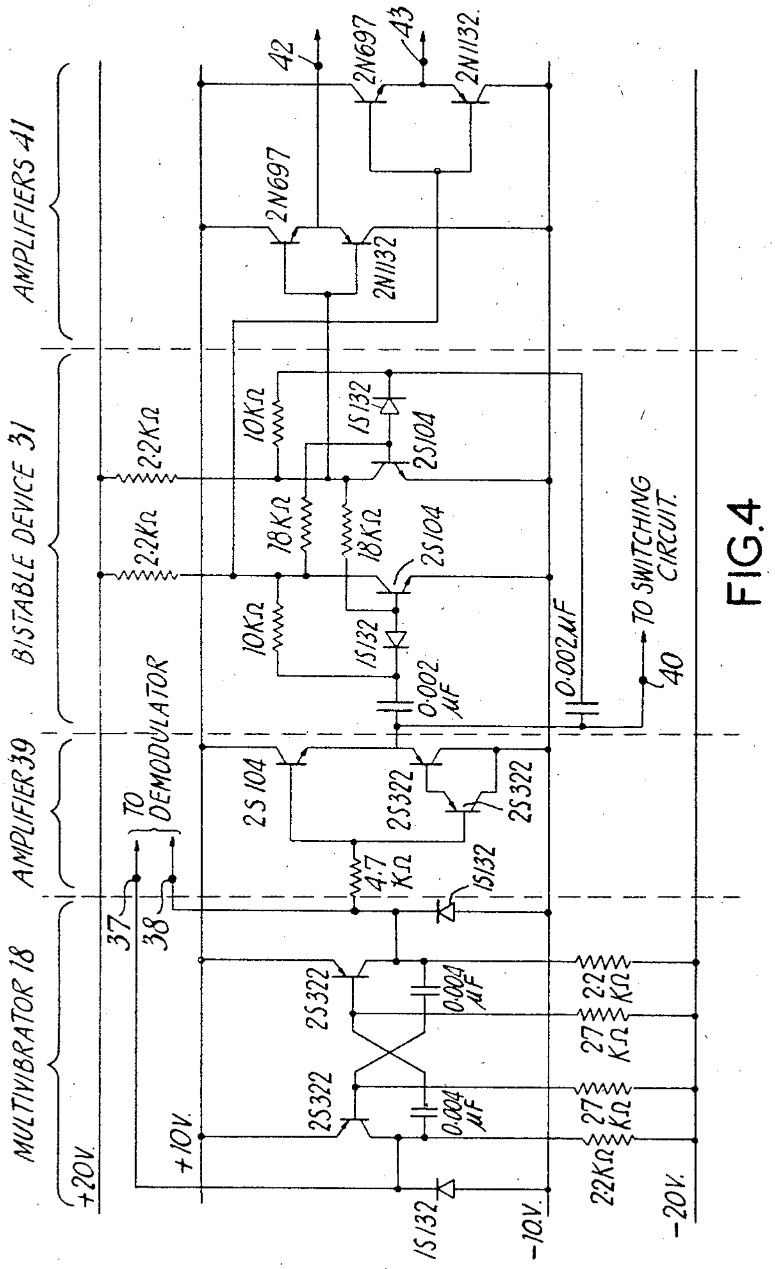
FIGURE 4 is a circuit diagram of a multivibrator and associated bistable device for use in the system of FIGURE 3.

The circuit of the information-storage system will now be described in greater detail. FIGURE 4 of the drawings shows, at the left-hand side, the multivibrator 18, which is of known form and which delivers, at a pair of output terminals 37 and 38, two 10 kc./s. pulse-trains which are phase-displaced by 180° relatively to each other. In addition, one of these pulse-trains is amplified by a transistor amplifier circuit 39 (FIGURE 4) of known form, the output of the circuit 39 being supplied to an output terminal 40.

The output from the amplifier circuit 39 is also supplied to the bistable device 31 (FIGURE 4) which is also of known form, the output of the bistable device 31 comprising two 5 kc./s. pulse-trains which are respectively amplified by known transistor amplifiers 41 (FIGURE 4) and then supplied to a pair of output terminals 42 and 43, the two amplified 5 kc./s. pulse-trains being phase-displaced by 180° relatively to each other.

Figure 5:
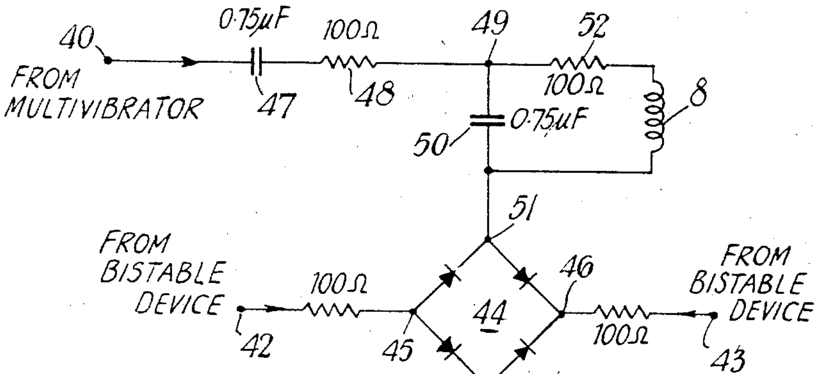
FIGURE 5 is a circuit diagram of a switch controlled by the circuit of FIGURE 4.

A preferred form of the switching circuit 16 (FIGURE 3) is shown in detail in FIGURE 5. It will be seen that the effective switch 17 (FIGURE 3) is constituted by a diode-rectifier bridge 44 (FIGURE 5). Two opposite corners, 45 and 46, of the bridge 44 are connected, in each case via a 100-ohm resistor, respectively to the output terminals 42 and 43 (FIGURE 4), so that the corners 45 and 46 are respectively supplied with 5 kc./s. pulse-trains which are 180° out of phase with each other.

It will also be seen, from FIGURE 5, that the output terminal 40 of the multivibrator (FIGURE 4) is connected, via a capacitor 47 and a resistor 48 connected together in series, to a common point 49.

The common point 49 is connected, via a capacitor 50, to another corner 51 of the bridge 44, the capacitor 50 being shunted by a resistor 52 connected in series with an interrogate winding 8 of the magnetic core 1. The remaining corner 53, of the bridge 44 is connected to earth.

The rectifiers of the bridge 44 are so arranged that, during each positive-going half-cycle of the 5 kc./s. pulse-train applied to the corner 45, during which time a negative-going half-cycle of the other 5 kc./s. pulse-train is applied to the corner 46, all of the rectifiers of the bridge 44 conduct, and so effectively connect the corner 51 to earth via the corner 53, thus permitting one complete cycle of the 10 kc./s. pulse-train applied to the terminal 40 to pass through the interrogate winding 8 to earth, thereby providing the interrogate signal. The resistors 48 and 52 may be considered to suitably limit the amplitude of the interrogate signal. The purpose of the capacitor 50 is to slightly delay the occurrence of the interrogate signal after the closure of the effective switch 17 (FIGURE 3), so as to allow the core 1 to effectively respond to the error signal supplied to the input winding 7 (FIGURE 3) before sampling of the core 1 is effected by the interrogate signal.

Figure 6:
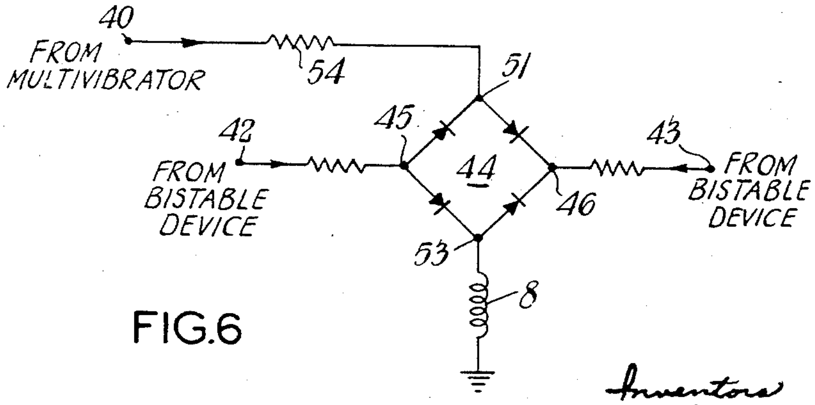
FIGURE 6 shows a modified form of the circuit of FIGURE 5.

A modified form of the switching circuit 16 is shown in FIGURE 6. The circuit of FIGURE 6 is very similar to that of FIGURE 5, and corresponding circuit elements are therefore marked with the same reference numerals. It will be seen that the principal differences are that the output terminal 40 of the multivibrator amplifier is now directly connected, via a resistor 54 to the corner 51 of the bridge 44, while the corner 53 is connected to earth via the interrogate winding 8. The circuit of FIGURE 6 operates similarly to that of FIGURE 5, but no provision is made to delay the occurrence of the interrogate signal.

Figure 7:
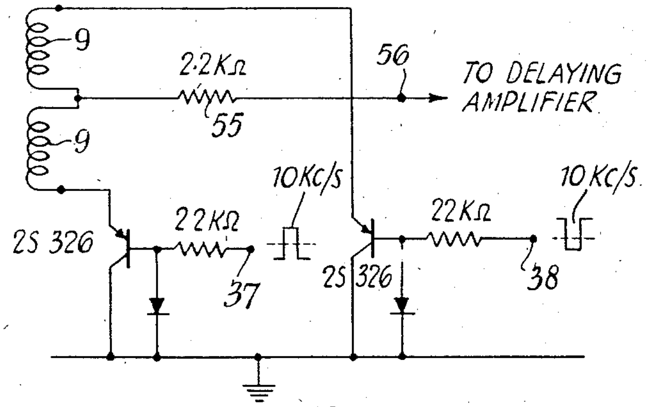
FIGURE 7 is a circuit diagram of a demodulator for rectifying the output from the core of FIGURE 1.

The demodulator 19 (FIGURE 3) is shown in detail in FIGURE 7, and is of generally known form, being arranged to rectify the output-voltage pulses induced by the interrogate signal in the output winding 9 of the magnetic core 1. It will be noted that the output winding 9 is centre-tapped, the centre tap being connected, via a resistor 55, to an output terminal 56. The demodulator 19 includes two switching transistors which are respectively connected to the two output terminals 37 and 38 (FIGURE 4) of the multivibrator 18, so that the two transistor switches are operated alternately, respectively by the two 180°-phase-displaced 10 kc./s. pulse-trains which appear at the terminals 37 and 38.

Figure 21:
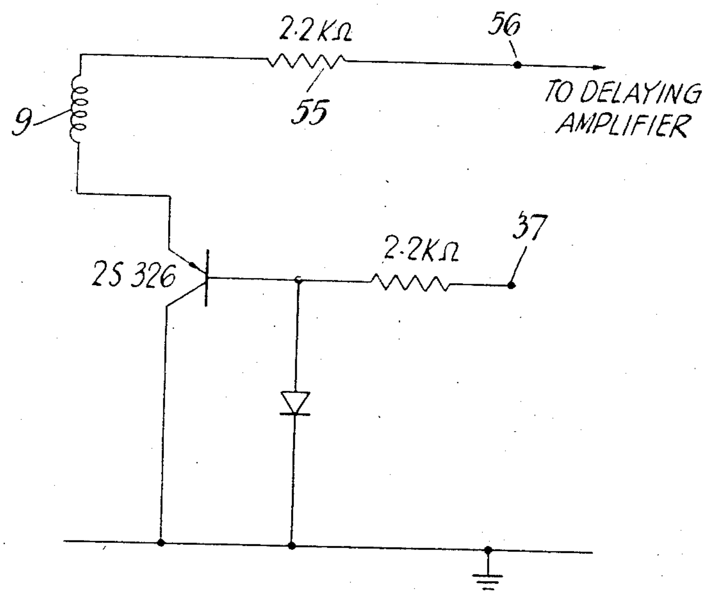
FIGURE 21 shows an alternative form of the circuit of FIGURE 7.

An alternative circuit for the demodulator 19 is shown in FIGURE 21, and differs from the circuit of FIGURE 7 in that the output winding 9 is not centre-tapped, and only one switching transistor is employed and is supplied from the terminal 37.

The output from the demodulator 19 comprises rectified pulses, which appear at the output terminal 56. These pulses are supplied to the input of the delaying amplifier 20, which is shown in detail in FIGURE 8. It will be seen that the pulses from the terminal 56 are supplied to one input terminal 62 of a two-input direct voltage amplifier indicated at 63, the other input terminal 64 of the amplifier 63 being connected to earth via a resistor 65. The circiut of the amplifier 63 is shown in detail in FIGURE 9, and is of known form.

The output on output terminal 68 of the amplifier 63 (FIGURE 8) is further amplified by a single-stage transistor amplifier of known form, the amplified output appearing at the output terminal 21. The output terminal 21 is connected to the input terminal 62 of the amplifier 63 via a feedback circuit comprising a resistor 66 connected in parallel with a capacitor 67. The effect of the resistor 66 and the capacitor 67 is to cause the output of the circuit of FIGURE 8 to be delayed relatively to the input by a time interval sufficient to permit the correct operation of the effective switches 28 and 17, as discussed above.

Figure 8:
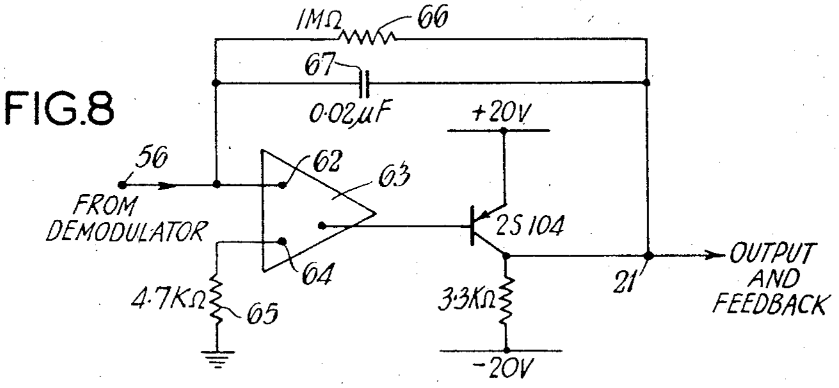
FIGURE 8 is a circuit diagram of a delaying amplifier employed to amplify the output of the demodulator of FIGURE 7.
Figure 9:
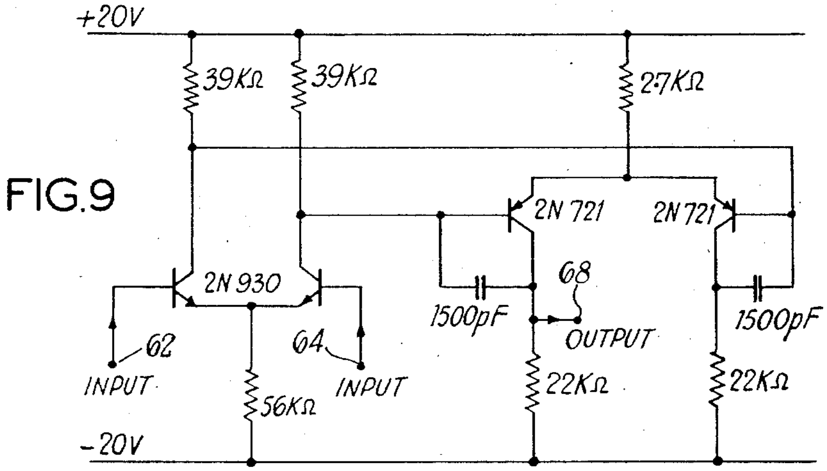
FIGURE 9 is a circuit diagram of a direct-current amplifier which can be used in the circuits of FIGURES 8 and 10.
Figure 10:
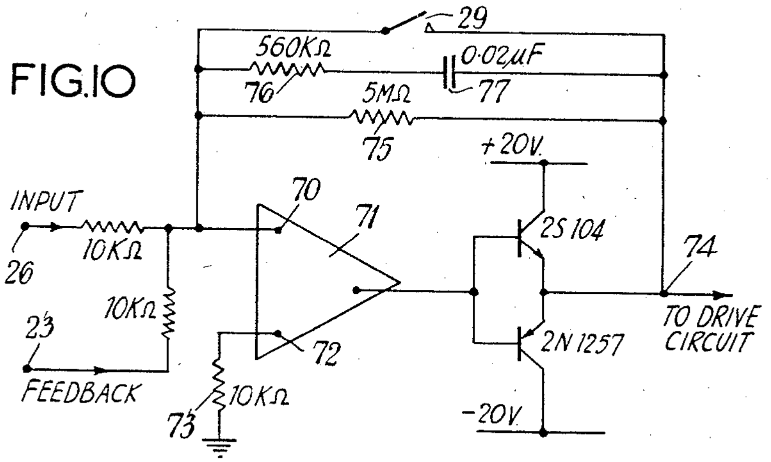
FIGURE 10 is a circuit diagram of a differential amplifier used in the system of FIGURE 3.

The output of the circuit of FIGURE 8 is supplied, from the output terminal 21 and via the feedback line 22 (FIGURE 3), to the input terminal 23 of the differential-amplifier unit which is shown in detail in FIGURE 10. The input terminals 26 and 23 (FIGURE 10) are each connected, via a separate resistor, to one input terminal 70 of a two-input direct voltage amplifier 71, the other input terminal 72 of the amplifier 71 being connected to earth via a resistor 73. The circuit of the amplifier 71 may also have the known form shown in FIGURE 9.

The output of the amplifier 71 (FIGURE 10) is further amplified by a transistor amplifier of known form, the amplified output appearing at the output terminal 74. The output terminal 74 is connected to the input terminal 70 of the amplifier 71 via a feedback circuit having two parallel arms one of which contains a resistor 75 and the other of which contains a resistor 76 connected in series with a capacitor 77. The resistors 75 and 76 and the capacitor 77 are so chosen, having regard to the resistor 66 and capacitor 67 in the feedback circuit (FIGURE 8) of the delaying amplifier 20, that the closed loop of the information-storage system (which loop can be seen in FIGURE 3) is suitably stabilised.

Figure 11:
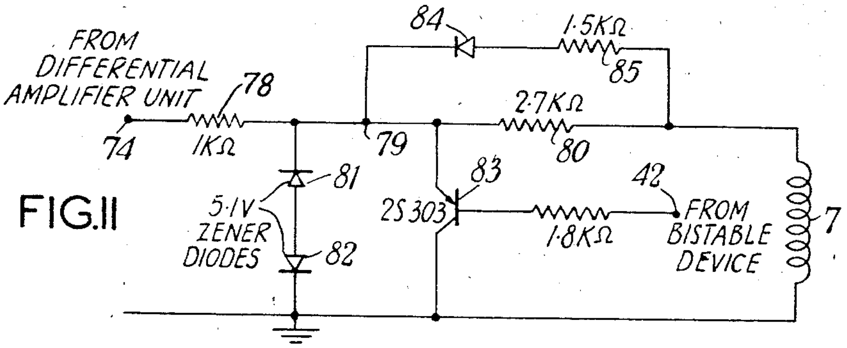
FIGURE 11 is a circuit diagram of a drive circuit for driving the core of FIGURE 1 from the output of the amplifier of FIGURE 10.

The error signal appearing at the output terminal 74 (FIGURE 10) is supplied to the drive circuit 27, which is shown in detail in FIGURE 11. Referring to FIGURE 11, the terminal 74 is connected, via a resistor 78, to a common point 79 which is connected, via a resistor 80 and the input winding 7 of the magnetic core 1, to earth. The common point 79 is also connected to earth via a pair of back-to-back Zener diodes 81 and 82. Further, the common point 79 can be directly connected to earth via a switching transistor 83 the operation of which is controlled by one of the 5 kc./s. pulse-trains, derived from the output terminal 42 of the bistable device 31. Finally, the resistor 80 is shunted by a rectifier 84 connected in series with a resistor 85.

The effective on-off switch 28 (FIGURE 3) is provided by the switching transistor 83 which is arranged, in known manner and under the control of the 5 kc./s. pulse train just referred to, to connect the terminal 79 to earth, and so to disconnect the error signal from the input winding 7, during those alternate cycles of the 10 kc./s. supply from the multivibrator 18 during which the effective switch 17 (FIGURE 3) is closed to supply an interrogate signal to the interrogate winding 8.

The purpose of the Zener diodes 81 and 82 is to limit the amplitude of the error signal, and so to avoid "oversetting" of the magnetic core 1, as discussed above.

Figure 12:
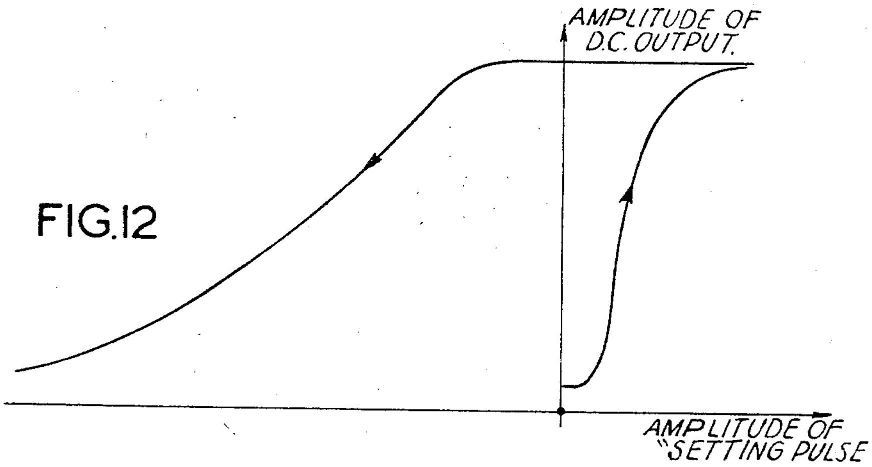
FIGURE 12 is a graph illustrating the operation of the system of FIGURE 3.

The purpose of the diode 84 and the resistor 85 will now be discussed. Suppose that, in the circuit of FIGURE 3, the switch 28 is held permanently open, that the magnetic core 1 has been "blocked" as described above, and that a circuit (not shown) is provided, to supply "setting" pulses to the input winding 7 of the core 1. Suppose a small setting pulse is first applied and removed, whereafter an interrogate signal is supplied and the output of the amplifier 20 noted. Thereafter, a larger setting pulse is applied, whereafter a further interrogate signal is supplied and the output of the amplifier 20 again noted. Thereafter, the process is repeated with increasingly large setting pulses, until the magnetic core 1 is nearly "overset." The polarity of the setting pulses is then reversed, and the process repeated with increasingly large pulses. FIGURE 12 shows the result of such an experiment, the amplitude of the output of the amplifier 20 being plotted, as ordinate, against the amplitude of the setting pulse, plotted as abcissa. It will be seen that, not only is the amplitude of the output of the amplifier 20 a non-linear function of the amplitude of the setting pulse, but it is also a two-valued function of the amplitude of the setting pulse. The purpose of the diode 84 and the resistor 85 in the circuit of FIGURE 11 is to attempt to remove, from the response of the information-storage system, the tendency for the output of the amplifier 20 to have two possible values for a given analogue signal; the effect of the diode 84 and the resistor 85 is to cause the error signal, when of one polarity, to cause a larger "setting" pulse to be applied to the input winding 7 than when the error signal is of the same amplitude but of the opposite polarity.

It is believed that the operation of the information-storage system will be substantially clear, from the above description. Briefly, the magnetic core 1 is first "blocked", as described above. The analogue signal is then applied to the input terminal 25 (FIGURE 3) and with the switch 29 open, and since there is initially no signal fed back along the feedback line 22, the amplified analogue signal will therefore be supplied, through the switch 28, to the input winding 7 of the magnetic core 1. The core 1 will therefore be "set" according to the amplitude of the amplified analogue signal.

During the next cycle of the 10 kc./s. supply from the multivibrator 18, the switch 28 will be opened and the switch 17 closed, so that an interrogate signal will be applied to the interrogate winding 8. Two corresponding rectified output-voltage pulses will be supplied to the amplifier 20, and, after a suitable delay, a direct voltage will appear at the output of the amplifier 20, the amplitude of this direct voltage representing the information stored within the core 1.

During the next cycle of the 10 kc./s. supply from the multivibrator 18, the switch 28 will be closed and the switch 17 open. An error signal will therefore be supplied to the input winding 7, the amplitude of the error signal being proportional to the difference in amplitude of the analogue signal and of the output of the amplifier 20. The effect of this error signal will be to so change the information stored (in the form of a flux-pattern) within the core 1, that the output of the amplifier 20 tends to become more nearly equal in amplitude to the amplitude of the analogue signal.

During successive cycles of the 10 kc./s. supply from the multivibrator 18, the information stored within the core 1 will tend to be successively modified, the amplitude of the output from the amplifier 20 tending to become more and more nearly equal to the amplitude of the analogue signal.

After a suitable interval, the switch 29 can be closed, to effectively isolate the input winding of the core 1. The analogue signal can then be removed from the terminal 25. The analogue information, representing the amplitude of the analogue signal, will then remain stored within the magnetic core 1, but can be sampled at any required time, by closing the switch 17 to connect a suitable interrogate signal to the interrogate winding 8; the amplitude of the output of the amplifier 20 will then equal the amplitude of the analogue signal previously applied to the input terminal 25.

In a modification of the invention (not shown in the drawings), the switch 29 is arranged to be capable of being closed only at a definite time in relation to the operation of the effective switches 17 and 28.

It has been found desirable to control the temperature of the magnetic core 1, while the information-storage device is in use, for example by placing the core 1 in a constant-temperature enclosure 86 (FIGURE 3). Where the magnetic core 1 is a transfluxor manufactured by Mullard Limited, it has been found desirable to control the temperature of the transfluxor to 55° C., plus or minus ½° C. It may also be desirable also to place the amplifiers of the information-storage device within constant-temperature enclosures.

Figures 13, 14, 15, 16:
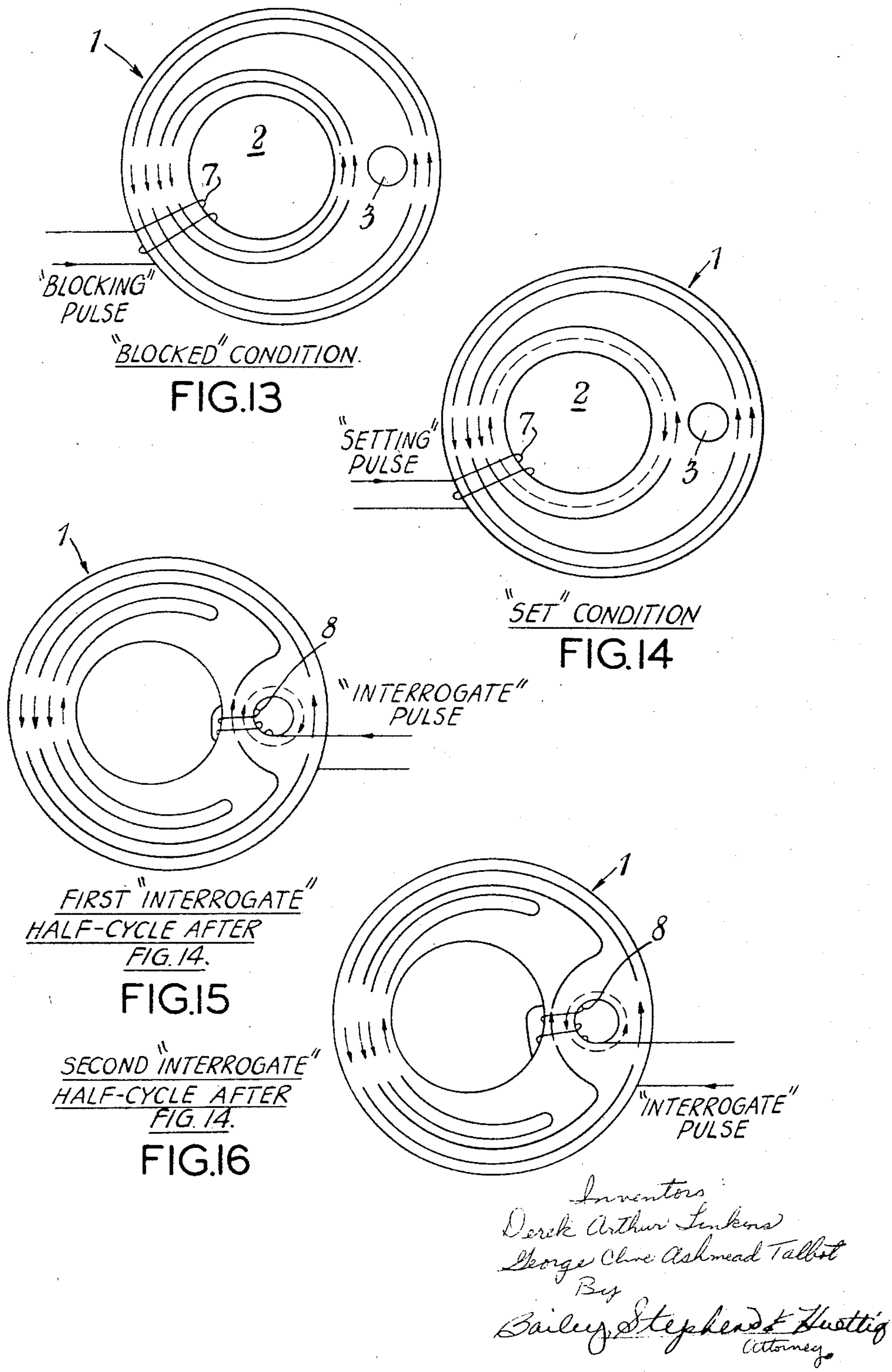
FIGURES 13–19 illustrate magnetic-flux patterns within the core of FIGURE 1.

As mentioned above, the operation of the magnetic core 1, when used to store flux-patterns, is not well understood. It is, however, believed that the operation may be as schematically shown in FIGURES 13–19. FIGURE 13 shows the core 1 in the "blocked" condition, the core 1 having been magnetically saturated by a "blocking" pulse applied to the input winding 7; it will be noted that magnetic lines of force extend around the core 1 in an anticlockwise direction. In FIGURE 14, a "setting" pulse, of opposite polarity to the blocking pulse, has been supplied to the input winding 7, and the material of the core 1 which immediately surrounds the larger aperture 2 has been magnetically saturated in the opposite (clockwise) direction. If, with the core 1 in the state of FIGURE 14, the first half-cycle of a suitable interrogate pulse is supplied to the interrogate winding 8, then a flux-path is available around the smaller aperture 3, and it is believed that the core 1 now takes up the flux-pattern shown in FIGURE 15. If, with the core 1 in the state of FIGURE 15, the second half-cycle of the interrogate pulse is applied to the interrogate winding 8, then it is believed that the core 1 now takes up the flux-pattern shown in FIGURE 16.

Figures 17, 18:
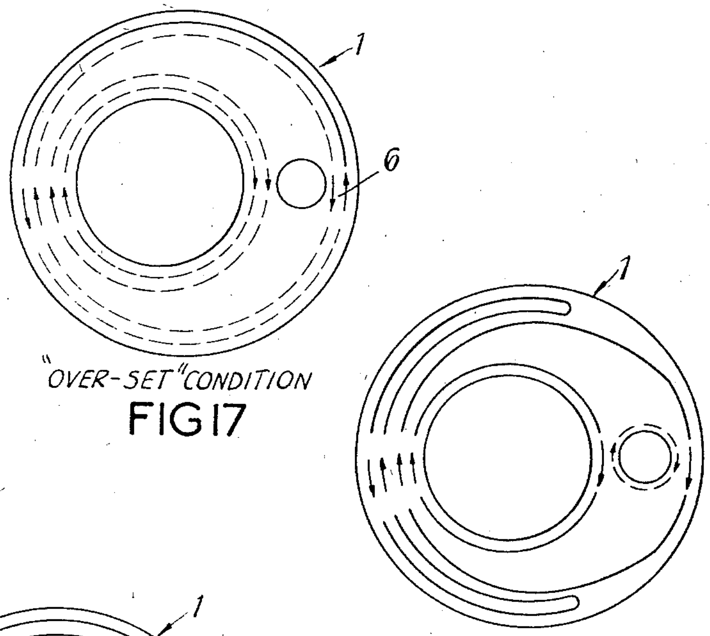
Figure 19:
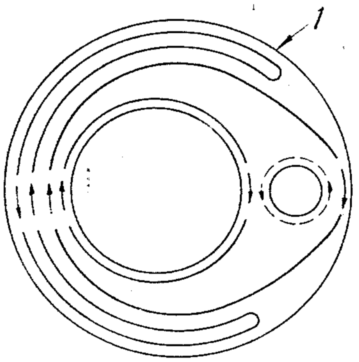

If the core 1 is "over-set" as described above, then the effect of the overlarge setting pulse is to reverse the direction of magnetic saturation of at least a part of the limb 6, as indicated in FIGURE 17. If the first half-cycle of a suitable interrogate pulse is now applied to the interrogate winding 8, then it is believed that the flux-pattern of the core 1 takes the form of FIGURE 18; this condition must be avoided, because the resulting induced voltage in the output winding 9 cannot be distinguished from the voltage induced in the output winding 9 in the case of FIGURE 15. If, with the core in the state of FIGURE 18, the second half-cycle of the interrogate pulse is applied to the interrogate winding 8, then it is believed that the flux-pattern of the core 1 takes the form of FIGURE 19; this condition must also be avoided because the resulting induced voltage in the output winding 9 cannot be distinguished from the similar voltage induced in the case of FIGURE 16.

It should be noted that the time integral of the voltage induced in the output winding 9 is approximately proportional to the cross-sectional area of the core material around the larger aperture 2. This area, however, must not be too large, if high-frequency switching is required. Also, the power dissipation in the core is approximately proportional to the volume of material in which the flux reversals occur. The shape of the core 1 should desirably be such that the effective cross-sectional area of any part of the core extending between the aperture 2 and the outer boundary of the core 1 is substantially constant. Additionally, the ratio of the circumference of the larger aperture 2 to the length of the magnetic path which gives full output around the smaller aperture 3 should be greater than unity. A large value of this ratio enables a larger interrogate signal to be applied without destroying the isolation between the input and the output windings. A large value of this ratio is also important from the point of view of switching speeds, as, the larger the interrogate signal applied, the faster may be the switching speed employed.

Figure 20:
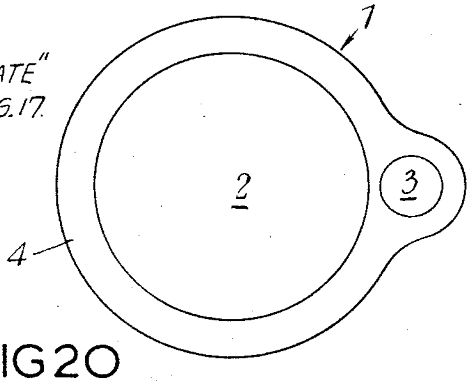
FIGURE 20 shows a core of improved design.

FIGURE 20 shows a recommended shape for the core 1. The shape is characterised in that the aperture 2 is made relatively large, and the aperture 3 is located within an extension from the limb 4; this arrangement provides a relatively short flux-path around the aperture 3, so that the interrogate signal has relatively little effect upon the magnetisation of the limb 4. In addition, the core of FIGURE 20 is easier to wind than that shown in FIGURE 1, and permits the use of heavier-gauge wire, or more turns, for the windings.

It should be noted that with the system described above, no observable decay has been found in the output with respect to time.

It will be observed that the storage system described can be manufactured economically to quite small dimensions and does not involve the use of any moving parts.

We claim:

1. An analogue-type information-storage system which comprises a magnetic core having first and second apertures, an input winding associated with the first aperture, an interrogate winding and an output winding associated with the second aperture, and connected respectively to a non-destructive read-out means and an output line, the non-destructive read-out means being arranged to apply an interrogate signal of a selected frequency to the interrogate winding, the arrangement being such that the application of the interrogate signal derives from the output winding on the output line an output signal the amplitude of which represents the information actually stored within the core in the form of a magnetic flux pattern, delay means in the output line for delaying the output signal, comparison means having an output connected to the input winding and having inputs connected to the output of the delay means and to means for deriving an input signal, the amplitude of which represents the information to be stored, the comparison means being arranged to compare the delayed output signal with the input signal to derive on its output an error signal, the amplitude of which represents the difference between the amplitudes of the input signal and the output signal, the error signal being applied to the input winding to modify the information stored within the core in the sense to tend to reduce the error signal, switch means operable at a frequency lower than said selected frequency and arranged to alternately connect the non-destructive read-out means to the interrogate winding and the comparison means to the input winding, and cut-off means operable to disconnect the error signal comparison means from the input winding.

2. A system according to claim 1, wherein the magnetic core is made of "ferrite" material.

3. A system according to claim 2, wherein the magnetic core is made of moulded ceramic "ferrite" material.

4. A system according to claim 1 wherein the material of the magnetic core has an approximately rectangular magnetic-hysteresis loop.

5. A system according to claim 1 wherein the first aperture is larger than the second aperture.

6. A system according to claim 5 wherein the first and second apertures are each of circular cross-section.

7. A system according to claim 5 wherein the apertures divide the core into a first limb surrounding the first aperture, a second limb located between the first and second apertures, and a third limb located at that side of the first aperture which is distant from the second aperture, the output winding being wound around the third limb.

8. A system according to claim 7, wherein the interrogate winding is wound around the second limb.

9. A system according to claim 8, wherein the input winding is wound around the first limb.

10. A system according to claim 1 wherein the magnetic core is provided by a "transfluxor."

11. A system according to claim 1 wherein the non-destructive read-out means comprises an oscillator arranged to generate a periodic interrogate signal of the said selected frequency.

12. A system according to claim 11, wherein the oscillator is a multivibrator.

13. A system according to claim 11 wherein the said selected frequency is approximately 10 kc./s.

14. A system according to claim 1 wherein the output line is connected to rectifying means arranged to rectify the output signal.

15. A system according to claim 14, wherein the rectifying means is a phase-sensitive demodulator.

16. A system according to claim 15 in which the non-destructive read-out means comprises an oscillator arranged to generate a periodic interrogate signal of the said selected frequency and wherein the operation of the demodulator is controlled by the oscillator.

17. A system according to claim 1 wherein the delay means is afforded by an amplifier having a feedback circuit connected between its output and its input.

18. A system according to claim 17, wherein the feedback circuit comprises a capacitor connected in parallel with a resistor.

19. A system accordng to claim 1 wherein the comparison means comprises a differential amplifier.

20. A system according to claim 19, wherein the differential amplifier includes a feedback connection between its output and its input and arranged to tend to stabilise the system.

21. A system according to claim 20, wherein the feedback connection includes a resistor connected in series with a capacitor.

22. A system according to claim 21, wherein the feedback connection also includes a further resistor connected in parallel with the resistor and the capacitor.

23. A system according to claim 1 wherein the switch means comprises a first switching circuit capable of disconnecting the comparison means from the input winding, and a second switching circuit capable of disconnecting the non-destructive read-out means from the interrogate winding.

24. A system according to claim 23, which includes a bi-state device arranged to control the alternate operation of the first and the second switching circuits.

25. A system according to claim 24 in which the non-destructive read-out means comprises an oscillator arranged to generate a periodic interrogate signal of the said selected frequency and wherein the bi-state device comprises a bistable device the operation of which is controlled by the oscillator.

26. A system according to claim 24 wherein the first switching circuit includes a switching transistor controlled by the bi-state device to disconnect the error signal from the input winding.

27. A system according to claim 24 wherein the second switching circuit includes a rectifier bridge controlled by the bi-state device to disconnect the said circuit means from the interrogate winding.

28. A system according to claim 1 wherein a delaying circuit is connected between the non-destructive read-out means and the interrogate winding, so as to delay the application of the interrogate signal to the interrogate winding for a predetermined period after the switch means has operated to tend to connect the non-destructive read-out means to the interrogate winding.

29. A system according to claim 28, wherein the delaying circuit includes a first capacitor connected in series with the interrogate winding.

30. A system according to claim 29, wherein the delaying circuit includes a second capacitor connected in parallel with the interrogate winding.

31. A system according to claim 1 which includes limiting means arranged to limit the maximum permissible amplitude of the error signal.

32. A system according to claim 31, wherein the limiting means includes a pair of Zener diodes connected back-to-back.

33. A system according to claim 1 which includes an electric circuit arranged to modify the error signal, in the sense to increase the effect of the error signal upon the magnetic core, when the error signal is of one polarity, but not to modify the error signal when the error signal is of the relatively opposite polarity.

34. A system according to claim 33, wherein the electric circuit comprises a first resistor arranged to supply the error signal to the input winding, the first resistor being connected in parallel with a circuit comprising a rectifier connected in series with a second resistor.

35. A system according to claim 1 wherein the cut-off means comprises a switch operable to connect the output of the comparison means to the input thereof.

36. A system according to claim 1 wherein the magnetic core is enclosed within a constant-temperature enclosure.

References Cited

UNITED STATES PATENTS

| | | | |
|---|---|---|---|
| 2,990,540 | 6/1961 | Sublette et al. | 340—174 |
| 2,959,731 | 11/1960 | Zeidler | 340—174 XR |
| 3,311,900 | 3/1967 | Gaunt | 340—174 |

BERNARD KONICK, *Primary Examiner.*

GARY M. HOFFMAN, *Assistant Examiner.*